United States Patent
Ohmori et al.

(10) Patent No.: US 6,610,135 B1
(45) Date of Patent: Aug. 26, 2003

(54) TITANIUM-CONTAINING FINELY DIVIDED PARTICULATE MATERIAL, AQUEOUS SOL COMPOSITION AND COATING LIQUID CONTAINING SAME, PROCESS FOR PRODUCING SAME, AND SHAPED ARTICLE HAVING FILM THEREOF

(75) Inventors: Masahiro Ohmori, Chiba (JP); Katsutoshi Tamura, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/763,172

(22) PCT Filed: May 24, 1999

(86) PCT No.: PCT/JP99/02712
§ 371 (c)(1),
(2), (4) Date: Feb. 20, 2001

(87) PCT Pub. No.: WO00/10921
PCT Pub. Date: Mar. 2, 2000

Related U.S. Application Data

(60) Provisional application No. 60/135,140, filed on May 20, 1999.

(30) Foreign Application Priority Data

Aug. 19, 1998 (JP) ............................................. 10/233011

(51) Int. Cl.$^7$ ............................... B32B 5/16; C09C 1/36
(52) U.S. Cl. ....................... 106/436; 106/437; 106/445; 423/69; 423/85; 428/402
(58) Field of Search ................................. 106/436, 437, 106/445; 423/69, 85; 428/402

(56) References Cited

U.S. PATENT DOCUMENTS

| | | | | |
|---|---|---|---|---|
| 3,861,946 A | * | 1/1975 | Waitkins et al. | 117/100 B |
| 4,927,464 A | * | 5/1990 | Cowie | |
| 5,032,375 A | * | 7/1991 | Ierot et al. | 423/598 |
| 5,149,519 A | | 9/1992 | Chopin et al. | |
| 5,173,386 A | * | 12/1992 | Murasawa | |
| 5,776,239 A | * | 7/1998 | Bruno | |
| 5,824,145 A | * | 10/1998 | Marganski et al. | |
| 5,837,050 A | * | 11/1998 | Okuda et al. | |
| 5,840,111 A | * | 11/1998 | Wiederhoft et al. | |
| 5,981,425 A | * | 11/1999 | Taoda et al. | 502/208 |
| 6,103,303 A | * | 8/2000 | Takahashi et al. | 427/212 |

FOREIGN PATENT DOCUMENTS

| | | |
|---|---|---|
| JP | 61-283629 | 12/1986 |
| JP | 02-014820 | 1/1990 |
| JP | 02-022127 | 1/1990 |
| JP | 02-196029 | 8/1990 |
| JP | 06-234525 | 8/1994 |
| JP | 09-067125 | 3/1997 |

* cited by examiner

*Primary Examiner*—H. Thi Le
(74) *Attorney, Agent, or Firm*—Sughrue Mion, PLLC

(57) ABSTRACT

A titanium-containing finely divided particulate material, characterized by exhibiting a light transmittance of at least 85% as measured at a wavelength of 450–700 nm for a thickness of 10 mm on an aqueous liquid containing the titanium-containing material in a concentration of 0.1 to 6.5 moles per liter as titanium even when the temperature of the liquid is elevated to the boiling point. The titanium-containing material usually has an average particle diameter of 0.8–50 nm, and gives a film having high photocatalytic activity and transparency. The titanium-containing finely divided particulate material is obtained by hydrolyzing titanium tetrachloride in an aqueous solution in the presence of a carboxylic acid.

18 Claims, 3 Drawing Sheets

TITANIUM-CONTAINING FINELY DIVIDED PARTICULATE MATERIAL, AQUEOUS SOL COMPOSITION AND COATING LIQUID CONTAINING SAME, PROCESS FOR PRODUCING SAME, AND SHAPED ARTICLE HAVING FILM THEREOF

This application is a 371 of PCT/JP99/02712 filed May 24, 1999 which claims benefit of provisional application 60/135,140, filed May 20, 1999.

TECHNICAL FIELD

This invention relates to a titanium-containing finely divided particulate material having a minute particle diameter, an aqueous sol composition and coating liquid containing the titanium-containing material, a process for producing the titanium-containing material, a process for producing the coating liquid, and a shaped article having a film of the titanium-containing material.

The titanium-containing finely divided particulate material of the invention, and an aqueous sol composition and coating liquid containing the titanium-containing material are suitably used for the formation of a film on a substrate such as a ceramic or a synthetic resin. The thus-formed film exhibits excellent transparency, high photocatalytic activity, good adhesion to a substrate, and high ultraviolet rays absorption.

BACKGROUND ART

It is well known that titanium oxide is produced by hydrolysis of a titanium alkoxide or an aqueous solution of titanium tetrachloride, whereby a titanium oxide sol is produced.

Titanium oxide is known as exhibiting a photocatalytic activity. Recently, there have been proposed many techniques utilizing the photocatalytic activity. For example, a technique has been proposed wherein a titanium oxide sol is coated on the surface of a lighting appliance such as, for example, a glass tube of a fluorescent lamp or a cover thereof to form a film of titanium oxide. According to this technique, the titanium oxide film acts as a photocatalyst to decompose organic substances such as lampblack that adhere to the tube or cover, and thus, contaminants on the glass tube or cover are removed, and the glass or cover is prevented from contaminated.

In the case when a titanium oxide film formed on a substrate such as glass, plastic or other materials is utilized as a photocatalyst, it is required that the film has high transparency as well as high catalytic activity.

DISCLOSURE OF THE INVENTION

Therefore, a primary object of the present invention is to provide a titanium-containing finely divided particulate material which is capable of giving a film exhibiting an enhanced transparency while high catalytic activity is kept.

The inventors made extensive research into a process for producing titanium oxide by hydrolysis of titanium tetrachloride, and found that, by hydrolyzing titanium tetrachloride in an aqueous solution in the presence of a specific carboxylic acid, an aqueous coating liquid (i.e., a sol) of a titanium-containing finely divided particulate material having an average particle diameter of about 0.8 to 50 nm can be obtained, which has hitherto not been obtained; and that a film exhibiting excellent transparency which has hitherto not been obtained, while high catalytic activity is kept, can be formed from the sol. Based on these findings, the present invention has been completed.

In one aspect of the present invention, there is provided an amorphous titanium-containing finely divided particulate material, characterized in that said titanium-containing material has an average particle diameter in the range of 0.8 to 15 nm, and is prepared by hydrolyzing titanium tetrachloride in an aqueous solution in the presence of at least one carboxylic acid selected from oxalic acid, citric acid, tartaric acid, malic acid and succinic acid; and said titanium-containing material exhibits a light transmittance of at least 85% as measured at a wavelength of 450–700 nm for a thickness of 10 mm on an aqueous liquid containing the titanium-containing material in a concentration of 0.1 to 6.5 moles per liter as titanium.

In another aspect of the present invention, there is provided an aqueous sol composition or coating liquid of a titanium-containing finely divided particulate material, characterized by comprising the above-mentioned titanium-containing finely divided particulate material having an average particle diameter in the range of 0.8 to 15 nm, and further comprising at least one carboxylic acid selected from oxalic acid, citric acid, tartaric acid, malic acid and succinic acid; said titanium-containing material being contained in a finely dispersed form in a concentration of 0.1 to 6.5 moles as titanium per liter of the aqueous sol composition or coating liquid; and said coating liquid exhibiting a light transmittance of at least 85% as measured at a wavelength of 450 to 700 nm for a thickness of 10 mm.

In a further aspect of the present invention, there is provided a process for producing the above-mentioned titanium-containing finely divided particulate material or the above-mentioned titanium oxide-containing coating liquid, characterized in that titanium tetrachloride is hydrolyzed in an aqueous liquid in the presence of at least one carboxylic acid selected from oxalic acid, citric acid, tartaric acid, malic acid and succinic acid.

In a further aspect of the present invention, there is provided a shaped article comprising a shaped substrate and a film formed on a surface of the substrate; said film comprising the above-mentioned titanium-containing finely divided particulate material.

BEST MODE FOR CARRYING OUT THE INVENTION

Figure 1:
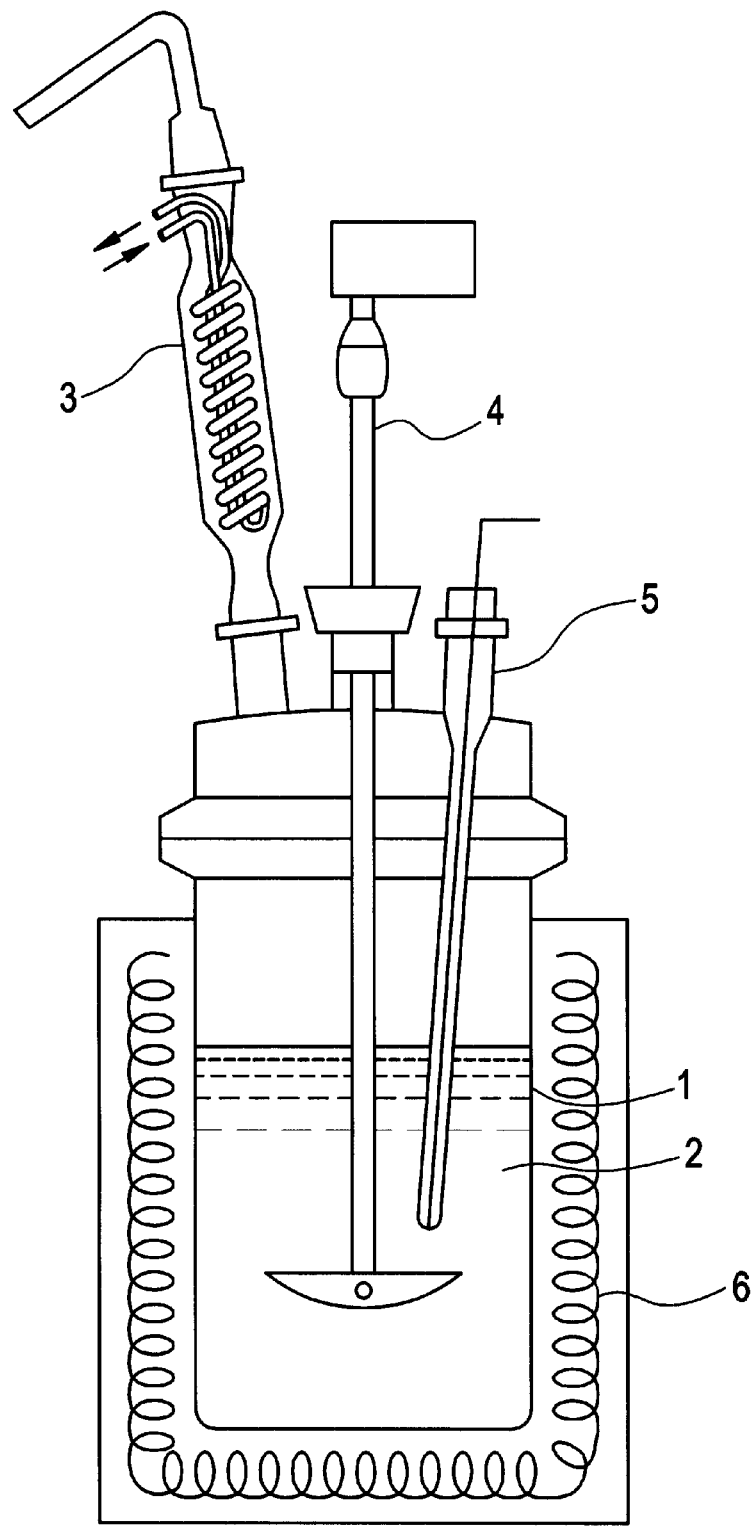
FIG. 1 is a schematic sectional view of a hydrolysis reaction vessel used in the process for producing a titanium-containing finely divided particulate material according to the present invention.

The titanium-containing finely divided particulate material of the present inventors can be produced by hydrolyzing titanium tetrachloride in the presence of a carboxylic acid in an aqueous solution. The details of chemical composition and structure of the titanium-containing finely divided particulate material produced by the hydrolysis are not clear.

But, the titanium-containing material is in the form of very finely divided monodisperse particles, and is clearly different from conventional titanium dioxide particles prepared by hydrolyzing titanium tetrachloride in an aqueous solution in the conventional manner. A film formed from an aqueous liquid containing a finely dispersed titanium-containing particulate material of the present invention keeps high catalytic activity and has excellent transparency as compared with a film formed from the conventional titanium dioxide.

The process for producing the titanium-containing finely divided particulate material of the present invention comprises a step of hydrolyzing titanium tetrachloride in an aqueous solution at an elevated temperature, characterized in that the hydrolysis is carried out in the presence of a specific carboxylic acid. The hydrolysis of titanium tetrachloride can also be carried out in a water-soluble organic solvent, but the hydrolysis in such solvent is not preferable.

When the concentration of titanium tetrachloride in an aqueous solution of titanium tetrachloride for hydrolysis is too low, productivity of the target titanium-containing material is poor. In contrast, when the concentration is too high, the reaction proceeds vigorously and finely divided particles are difficult to produce, and the resulting particles have poor dispersibility. Therefore, the concentration is preferably in the range of 0.1 to 6.5 moles per liter as titanium.

In a process for producing the titanium-containing finely divided particulate material of the present invention, a carboxylic acid is used in a form of dissolved in an aqueous medium, and hence, carboxylic acids which are readily soluble in water are advantageously used, which include oxalic acid, citric acid, tartaric acid, malic acid and succinic acid. Oxalic acid, citric acid, tartaric acid, malic acid and succinic acid are usually used alone, but may be used as a combination of at least two thereof.

The amount of carboxylic acid used is preferably in the range of 0.01 to 10 moles, more preferably 0.01 to 5 moles per mole of titanium atom. The concentration of carboxylic acid in an aqueous solution for hydrolysis is preferably in the range of 0.1 to 10 moles per liter. When the amount of carboxylic acid is too small, a white-turbid sol tends to be produced during the process of hydrolysis. In contrast, when the amount is too large, a carboxylic acid salt begins to precipitate, which is not desired.

Preferably, a predetermined amount of carboxylic acid is incorporated in a solvent and dissolved thoroughly therein prior to hydrolysis. Then, titanium tetrachloride is added to the aqueous solution.

Titanium tetrachloride is hydrolyzed by maintaining an aqueous titanium tetrachloride solution at an elevated temperature. The temperature for hydrolysis of titanium tetrachloride is preferably within a range from 50° C. to the boiling point of the aqueous solution of titanium tetrachloride. When the temperature is lower than 50° C., completion of hydrolysis requires a long time. To conduct hydrolysis, the solution is heated to fall within the above temperature range, and the solution is allowed to react for 10 minutes to 12 hours at that temperature. When the temperature for hydrolysis falls within a higher side within the above-described range, the reaction time becomes shorter.

For hydrolysis of titanium tetrachloride at an elevated temperature, a procedure can be employed, which includes a procedure of heating an aqueous titanium tetrachloride solution to a predetermined temperature in a reaction vessel, and a procedure of heating water to a predetermined temperature in a reaction vessel, adding titanium tetrachloride to the pre-heated water, and then heating the aqueous solution to a predetermined temperature.

Hydrogen chloride generated from hydrolysis is preferably prevented from escaping from the reaction system, although some amount may escape so long as the amount is controlled. No particular limitation is imposed on a method for controlling the amount of escaping hydrogen chloride, and one possible method is pressurizing. However, the easiest and the most effective method comprises carrying out hydrolysis in an apparatus having a reaction vessel equipped with a reflux condenser. One preferable example of the apparatus is shown in FIG. 1. In FIG. 1, a reaction vessel 1 charged with an aqueous titanium tetrachloride solution 2 is equipped with a reflux condenser 3, a stirrer 4, a thermometer 5, and a heating means 6 for heating the vessel. Hydrolysis of titanium tetrachloride generates vapor consisting of water and hydrogen chloride, but a predominant amount of the vapor is condensed in the reflux condenser 3 and returned to the vessel 1. Therefore, hydrogen chloride escapes from the vessel 1 in very small amounts, if at all.

An aqueous sol produced by hydrolysis may be dried to yield a dry powder of the produced titanium-containing finely divided particulate material. However, since the powder is in the form of super micro-particles, it coagulates strongly, and the powder is difficult to recover as it is. Thus the intended excellent effect of the present invention becomes difficult to attain, and such a drying process is not practical.

When an aqueous sol produced by hydrolysis is used as it is, in accordance with needs, the sol may be subjected to a dechlorination treatment after hydrolysis. By carrying out the dechlorination treatment, a film having high photocatalytic activity and high transparency can be obtained more easily. Dechlorination can be performed by conventional methods such as electrodialysis, ion exchange by use of a resin, and electrolysis. When dechlorination is performed, the pH of the aqueous sol can be an index for the degree of dechlorination. The pH value falls within the range of about 0.5 to 5 in the case where the chlorine ion concentration is in the range of 50 to 10,000 ppm, and the pH value falls within the range of about 1 to 4 in the case where the chlorine ion concentration falls within the preferable range of 100 to 4,000 ppm.

An aqueous sol having dispersed therein the titanium-containing finely divided particulate material of the present invention may have incorporated with an organic solvent whereby a dispersion of the titanium-containing material in a mixed solvent of water and the organic solvent can be obtained.

When a film is formed from an aqueous sol having dispersed therein the titanium-containing finely divided particulate material, it is preferred that an aqueous sol produced through hydrolysis followed by dechlorination without drying is used as it is. It is not preferable that the aqueous sol is dried into a powder and the powder is dispersed in water to prepare an aqueous sol used for film-formation. This is because finely divided particles of the hydrolyzed material have high surface activity, and the surface activity becomes higher when the size of particles is reduced, making it very difficult to disperse the finely divided particles in water; in other words, the finely divided particles undergo coagulation, and a film formed from the coagulated particles exhibits poor transparency and low photocatalytic activity.

If desired, a stabilizer can be incorporated in the aqueous liquid as prepared by hydrolysis or the aqueous sol as prepared from the aqueous liquid for preventing coagulation of the aqueous liquid or the aqueous sol. The stabilizer used includes, for example, various surfactants such as conventionally used nonionic surfactants. The amount of the stabilizer is preferably in the range of 0.1% to 1% by weight based on the weight of the aqueous liquid or the aqueous sol.

The production process of the present invention preferably comprises the following steps: controlling the escape of hydrogen chloride which is generated during hydrolysis of an aqueous solution of titanium tetrachloride; adding a stabilizer to the liquid for preventing coagulation of particles; and subjecting the resultant liquid to a dechlorination treatment without drying the liquid. A film having high photocatalytic activity and high transparency can easily be formed from the thus-produced sol.

The chemical composition and structure of the titanium-containing finely divided particulate material having a minute particle diameter of the present invention has not been completely identified, but, in view of results of analysis and the characteristics, it is clear that the titanium-containing finely divided particulate material of the present invention is different from conventional titanium oxide sol particles prepared by hydrolyzing titanium tetrachloride according to the conventional procedure.

The titanium-containing finely divided particulate material prepared by the process of the present invention has usually an average particle diameter $d_{50}$ in the range of 0.0008 to 0.015 $\mu$m (0.8 to 15 nm). By the term "average particle diameter $d_{50}$" used herein we mean a particle diameter corresponding to 50% of the integral particle diameter distribution curve.

The aqueous sol or coating liquid of the titanium-containing finely divided particulate material of the present invention is, in contrast to the conventional titanium oxide sol, not white-turbid at ambient temperature, but is kept at a colorless transparent state even when it is heated to the boiling point. The aqueous sol or coating liquid exhibits a light transmittance of at least 85%, preferably at least 95%, as measured at a wavelength of 450–700 nm in a state placed in a square box-shaped quartz cell having a size of 10 mm×10 mm×45 mm (height); i.e., for a thickness of 10 mm.

The concentration of the titanium-containing finely divided particulate material in the aqueous sol is in the range of 0.1 to 6.5 moles/liter, preferably 0.1 to 4 moles/liter, as titanium, and is in the range of 1 to 30% by weight based on the weight of the sol. When the concentration of the titanium-containing material is too low, a process for application of the sol to form a film requires a long time, and the cost for film formation becomes high. In contrast, when the concentration of the titanium-containing material is too high, the particles are coagulated and the aqueous sol becomes unstable. Further, a sol containing the titanium-containing material in a concentration exceeding 6.5 moles/liter as titanium is difficult to produce.

In order to improve film-formability, a water-soluble polymer can be added to the aqueous sol or coating liquid of the titanium-containing finely divided particulate material prepared by the process of the present invention. As specific examples of the water-soluble polymer added to the aqueous sol or coating liquid of the titanium-containing finely divided particulate material, there can be mentioned polyvinyl alcohol, methyl cellulose, ethyl cellulose and nitrocellulose. The polymer must be completely dissolved in the aqueous sol. The amount of the polymer in the aqueous sol is preferably not more than 10% by weight in view of the photocatalytic activity of a film. The polymer is preferably added to the aqueous sol after a dechlorination treatment, but may be added before a dechlorination treatment.

The hydrolysis process has been described above on a batch-type process, but a continuous process may also be employed, wherein a single reaction vessel is effectively employed as a continuous reactor while titanium tetrachloride is continuously added through an inlet port of the vessel and a reaction solution is continuously taken out from the outlet port located on the side opposite to the inlet port, and subsequently the solution is subjected to a dechlorination treatment.

An aqueous sol or coating liquid of the titanium-containing finely divided particulate material can be applied onto surfaces of substrates such as various materials and molded articles, to form a film on the surface of each substrate. No particular limitation is imposed on the type of substrates, and the substrates include, for example, ceramic, metal, plastic, wood and paper. When a catalyst carrier comprising, for example, alumina or zirconia is used as a substrate onto which the aqueous sol is applied to form a film, the film-coating formed on the carrier is used as a filmy supported catalyst. When a glass tube or a plastic cover of a lighting appliance such as a fluorescence lamp is used as a substrate on which a film is formed, the resulting film effectively prevents adhesion of contaminants on the surface of the glass tube or the cover, since the film exhibits enhanced photocatalytic activity and can decompose organic substances, such as lampblack, present on the film surface. When the aqueous sol is used for formation of a film on the surface of glass used for building construction or a wall substrate, the film can also prevent adhesion of contaminants.

As the method of applying the aqueous sol or coating liquid of the titanium-containing finely divided particulate material of the present invention onto a substrate to form a film, there can be employed, for example, a method of soaking the substrate into the sol, a method of spraying the sol on the substrate, or a method of applying the sol onto the substrate by a brush. Preferably, the aqueous sol is applied to a thickness of 0.01 to 0.2 mm as measured in the liquid state. After application, a solvent contained in the sol is removed by drying to obtain the intended film. The as-formed film can be used as a catalyst or for other applications.

When a substrate is a heat-resistant substance such as, for example, metal, ceramic or glass, a film formed on the substrate can be calcined. As a result of calcination, the film strongly adheres to the substrate and the hardness of the film increases. The calcination temperature is preferably at least 200° C. No particular limitation is imposed on the highest calcination temperature, and the temperature is suitable determined depending upon the particular heat resistance of the substrate. The calcination temperature is preferably around 800° C., since even when calcination temperature is excessively high, the hardness of the film and the adhesion to the substrate do not increase as an increase of the calcination temperature.

No particular limitation is imposed on the atmosphere used for calcination, and the calcination can be performed in air. In addition, no particular limitation is imposed on calcination time, and the calcination can be performed, for example, for 1 to 60 minutes. The thickness of the calcined film is about 0.02 to 1.0 $\mu$m when the aqueous sol is applied to a thickness as described above.

The present invention will now be described in more specifically by the following working examples that by no means limit the scope of the invention.

EXAMPLE 1

Distilled water (300 g) was placed in a reaction vessel comprising a reflux condenser as shown in FIG. 1, and citric acid (38.4 g) was dissolved in the water while a stirring rate was maintained at about 200 rpm. Subsequently, an aqueous titanium tetrachloride solution (63.4 g) (Ti content: 16.3% by weight, specific gravity: 1.59, purity: 99.9%) was added to the aqueous solution. After completion of addition, the resultant aqueous solution was heated to around 100° C. and maintained at this temperature for 60 minutes to thereby complete a hydrolysis reaction. After cooling, residual chlorine generated by the reaction was removed through electrodialysis until the concentration of chlorine reached 600 ppm. Subsequently, the pH value of the reaction solution was adjusted to 2, and polyvinyl alcohol, which was a water-soluble polymer serving as an auxiliary for film formation, was added to the solution to obtain a titanium-containing coating liquid containing 1.0% by weight of the polymer.

Figure 2:
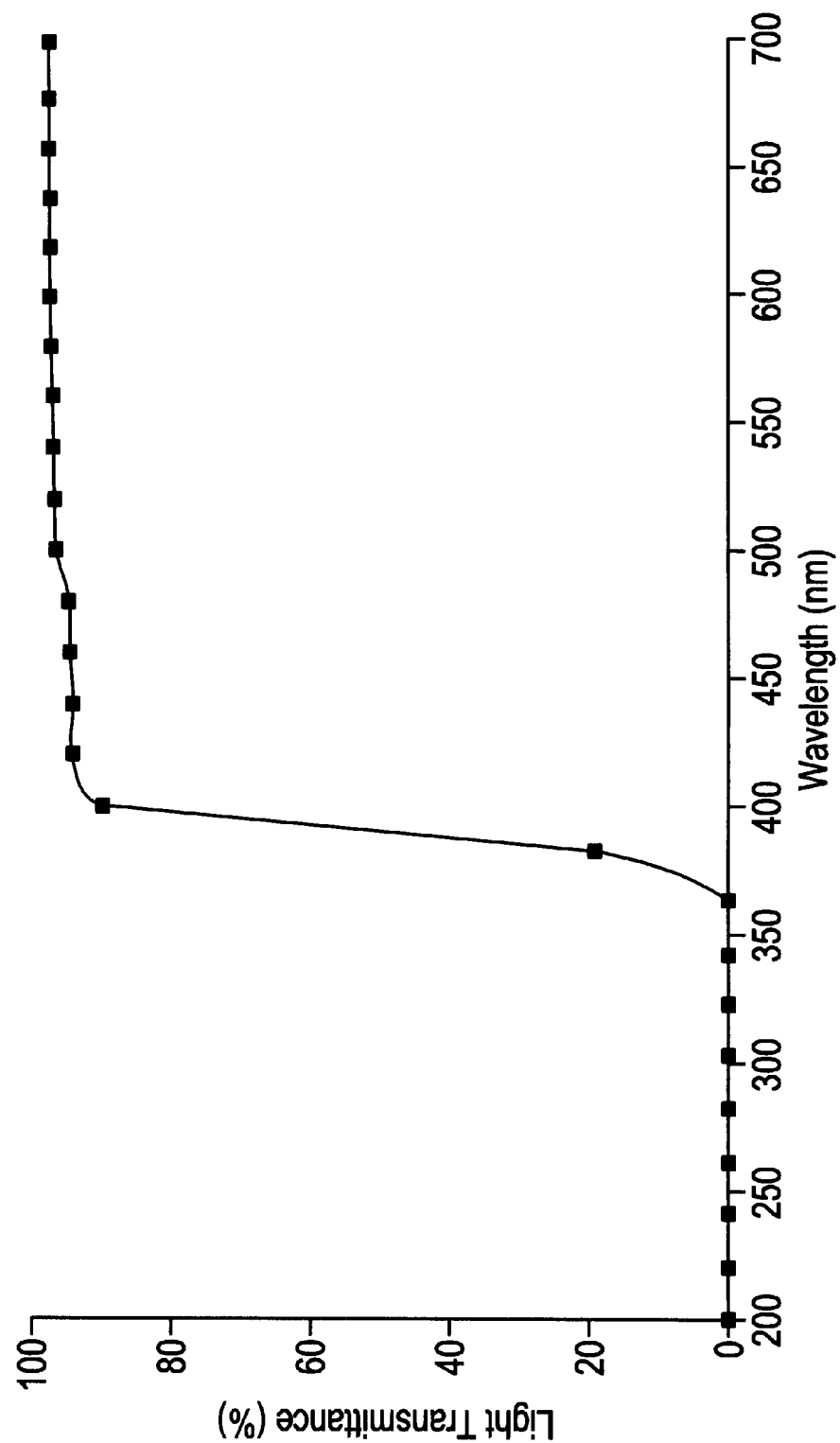
FIG. 2 is a graph showing light transmittance at a wavelength of 200–700 nm of an aqueous liquid containing a titanium-containing finely divided particulate material prepared in Example 1.

Transmission spectra of the thus-obtained coating liquid was measured at a wavelength of 200–700 nm in a quartz cell having a size of 10 mm×10 mm×45 mm by a spectrophotometer (Ubest 300 available from Nippon Spectrum). The results are shown in FIG. 2. As is apparent from FIG. 2, absorbance of the liquid was low within the range of visible rays between 380 nm and 700 nm, and the liquid was almost transparent. The light transmittance of the liquid at a wavelength of 450–700 nm was 95%.

Within the UV range, i.e., light of a wavelength of not more than 380 nm, a specific UV absorption of titanium oxide was observed. Further, measurement of particle-size distribution of the liquid by an apparatus for measuring particle-size distribution (DLS-7000, available from Otsuka Denshi) revealed that the titanium-containing material had an average particle diameter $d_{50}$ of 2.56 nm.

The coating liquid containing this titanium-containing material was very stable, and the produced minute particles did not precipitate even when one week or more elapsed after the production of the liquid. The particles were taken from the liquid by using a vacuum dryer at 60° C., and then subjected to electron diffraction by a transmission-type electron microscope. However, the particle was not identified as being formed of a particular compound. The dried particle was amorphous as determined by X-ray diffraction. When the particle was calcined at 400° C., a peak was observed which showed a rutile-type titanium oxide.

Figure 3:
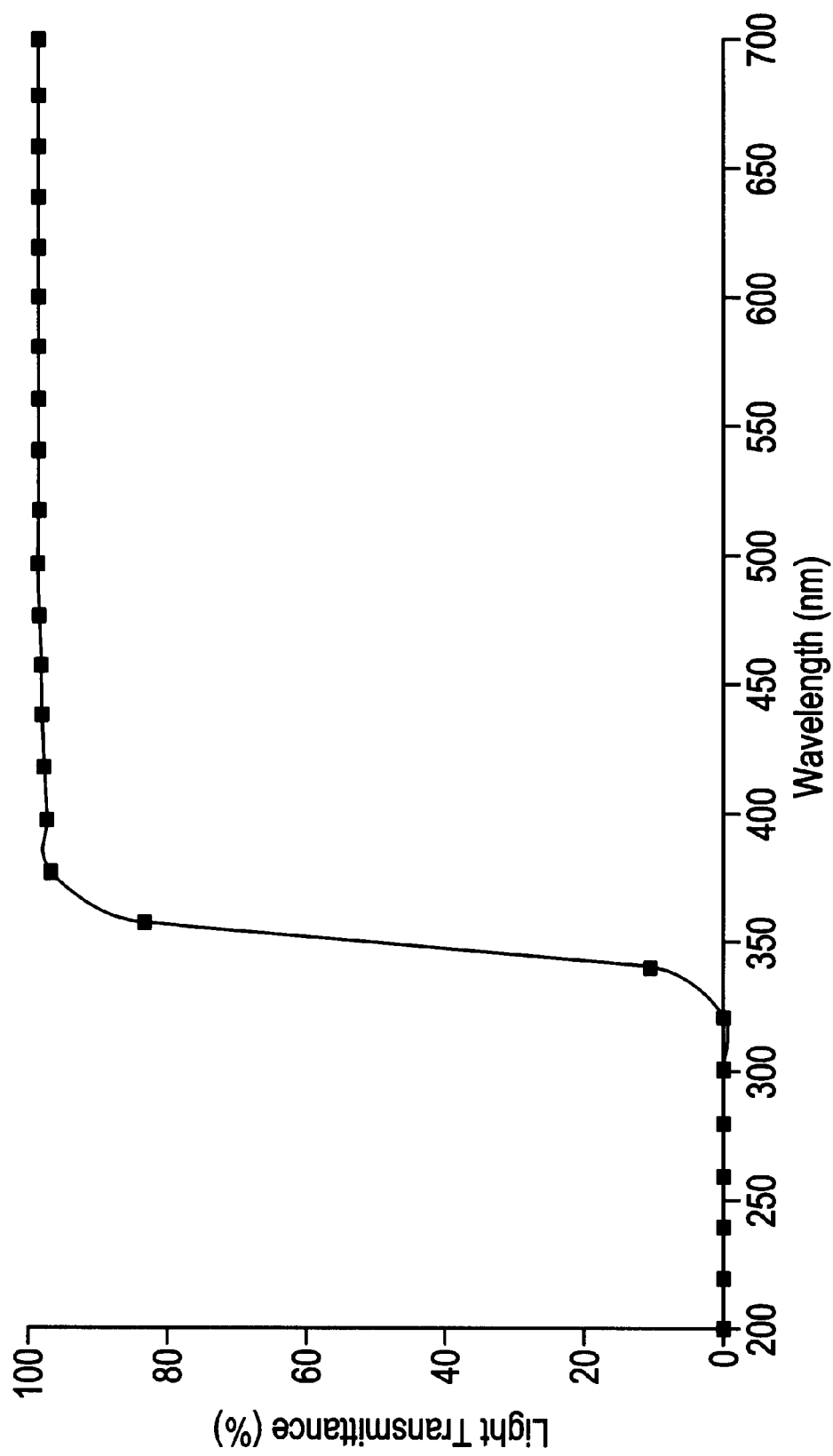
FIG. 3 is a graph showing light transmittance at a wavelength of 200–700 nm of a film formed from the aqueous liquid containing a titanium-containing finely divided particulate material prepared in Example 1.

Furthermore, the above-described coating liquid was uniformly applied onto the surface of a glass substrate by a spin coater, and dried at 100° C. by a dryer to form a transparent film on the glass surface. Transmission spectra in a wavelength region of 200 nm to 700 nm of the glass substrate coated with the film was measured. The results are shown in FIG. 3. As is apparent from FIG. 3, the light transmittance of the film was at least 97% within the range of visible rays, and the film was almost transparent. In addition, an absorption peak similar to a specific UV absorption of titanium oxide was observed within the range of UV rays.

Photocatalytic activity of the transparent film was performed by a color-fading test according to the following procedure: red ink containing an organic dyestuff was uniformly applied onto the surface of the film; and the film was irradiated with UV rays for one hour by a UV lamp (Black Light); and the absorption in % at a wavelength of 550 nm (i.e., central wavelength of red light) of the film after fading was compared with that obtained before fading. The results are shown in Table 1. As is apparent from Table 1, red color faded and the film was proved to exhibit photocatalytic activity when absorbing UV rays.

EXAMPLE 2

The procedure of Example 1 was repeated except that the amount of citric acid added was changed to 153.6 g, to obtain a titanium-containing coating liquid (i.e., an aqueous sol of titanium-containing material). Measurement of transmission spectra of the thus-obtained aqueous sol revealed that absorbance of the liquid was low within the range of visible rays, and the liquid was almost transparent. Within the UV range, an absorption peak similar to a specific UV absorption of titanium oxide was observed. In addition, measurement of particle-size distribution revealed that the titanium-containing material had an average particle diameter $d_{50}$ of 4.14 nm.

Furthermore, the above-described sol was uniformly applied onto the surface of a glass substrate by a spin coater and dried at 100° C. by a dryer to form a transparent film on the surface. Subsequently, the film was calcined in an electric furnace at 400° C. under an air atmosphere for 30 minutes, which caused the film to adhere to the glass substrate. Measurement of transmission spectra of the glass substrate having the film revealed that the light transmittance was at least 95% within the range of visible rays and the film was almost transparent. In addition, an absorption peak similar to a specific UV absorption of titanium oxide was observed within the UV range.

Photocatalytic activity of the titanium-containing material was evaluated by a fading test with red ink in the same manner as in Example 1. The results are shown in Table 1. As is apparent from Table 1, red color faded and the film was proved to exhibit photocatalytic activity.

EXAMPLE 3

The procedure of Example 1 was repeated except that citric acid was replaced by tartaric acid (60 g) to obtain a titanium-containing liquid (an aqueous titanium-containing sol). The absorbance of the obtained sol was the same as in Example 1. The titanium-containing material had an average particle diameter $d_{50}$ of 3.5 nm.

Furthermore, the above-described sol was coated on a glass substrate to form a film on the glass substrate. The film was dried at 200° C. in air, which caused the film to adhere to the substrate. The transmission spectra of the glass substrate with the film were the same as in Example 1. Photocatalytic activity of the titanium-containing material was evaluated by a fading test with red ink in the same manner as in Example 1. The results are shown in Table 1.

EXAMPLE 4

The transparent sol prepared in Example 1 was applied onto a pre-coated steel sheet, and then the sheet was sintered at 400° C. for 15 minutes to form a titanium oxide transparent film. The pencil hardness of thus-formed film was 5H, and a cross cut test of the film gave a value of 90/100.

EXAMPLE 5

Three kinds of titanium-containing material sols were prepared under the conditions as follows: the concentration of titanium tetrachloride in an aqueous solution of the titanium tetrachloride was 0.25 mole/l as titanium, and the mole ratio of citric acid added was 0.01, 1.0 or 10 (as ratio of 'concentration of citric acid' to 'titanium-converted concentration' by mole). Other conditions and operations were the same as those employed in Example 1. For the mole ratios of 0.01, 1.0, and 10, the average particle diameters $d_{50}$ of the titanium oxide particles in the sols were 1.10 nm, 4.4 nm, and 12.5 nm, respectively.

Comparative Example 1

The procedure of Example 1 for the preparation of an aqueous titanium-containing liquid was repeated except that citric acid was not added. The solution maintained transparency for about five minutes after addition of titanium tetrachloride. However, as the temperature of the solution elevated to about 60° C. or higher, the solution gradually became white-turbid, and the solution turned to white at a temperature of about 90° C. or higher. Measurement of particle-size distribution revealed that the titanium-containing particles in the thus-obtained liquid had an average particle diameter $d_{50}$ of 65 nm. Photocatalytic activity of the titanium-containing material was evaluated by a fading test with red ink in the same manner as in Example 1. But, the film became white-turbid and measurement could not be performed.

Comparative Example 2

Anatase-type titanium oxide particles having a particle diameter of 7 nm were dispersed in water by an ultrasonic dispersing apparatus to obtain an aqueous titanium oxide-containing liquid having a 2% by weight concentration. Hydrochloric acid serving as a deflocculating agent was added to the liquid to adjust the pH value of the solution to 1, to thereby obtain an aqueous titanium oxide-containing sol. Measurement of particle-size distribution revealed that the titanium oxide-containing particles in the sol had an average particle diameter $d_{50}$ of 35 nm. But, the sol was white-turbid. Photocatalytic activity of the titanium oxide-containing material was evaluated by a fading test with red ink in the same manner as in Example 1. The results are shown in Table 1.

Comparative Example 3

The procedure of Example 1 for the hydrolysis of titanium tetrachloride was repeated except that citric acid was replaced by acetic acid (12.1 g) and, after the addition of acetic acid, the mixture was maintained at a temperature of 50 to 55° C. for hydrolysis. Measurement of particle-size distribution of the thus-produced sol revealed that the titanium-containing particles in the sol had an average particle diameter $d_{50}$ of 50 nm. The sol was white-turbid.

TABLE 1

Fading test with red ink (Change of light transmittance at 550 nm)

| | Light transmittance (%) | |
| --- | --- | --- |
| | Before irradiation | After irradiation |
| Example 1 | 15 | 85 |
| Example 2 | 21 | 86 |
| Example 3 | 12 | 84 |
| Comp. Ex. 1 | Not measured due to white turbidity | |
| Comp. Ex. 2 | 15 | 80 |

Industrial Applicability

By hydrolyzing titanium tetrachloride in an aqueous solution in the presence of a carboxylic acid in accordance with present invention, a titanium-containing finely divided particulate material comprising minute particles having a particle size of 2 to 5 nm (which cannot be attained by the conventional process), and a sol or coating liquid containing the titanium-containing finely divided particulate material can be produced. The titanium-containing finely divided particulate material exhibits excellent transparency while maintaining high photocatalytic activity, which heretofore has not been produced. That is, an aqueous liquid containing the titanium-containing finely divided particulate material exhibits a light transmittance of at least 85% as measured at a wavelength of 450–700 nm for a thickness of 10 mm even when the aqueous liquid is heated to the boiling point.

The aqueous sol obtained by the production process of the present invention is highly transparent within the range of visible rays, and the film formed from the aqueous sol exhibits excellent photocatalytic activity and high transparency. These characteristics are due to the fact that the finely divided particles are so minute that they do not scatter nor absorb the visible rays, and the particles exist almost completely as primary particles without undergoing coagulation in the dispersion system.

The titanium-containing material of the present invention and the coating liquid or sol thereof exhibit high photocatalytic effect and high ultraviolet rays absorption, and thus, are useful as highly transparent photocatalytic material and UV shielding material.

The titanium-containing finely divided particulate material of the present invention and a sol or coating liquid thereof are used for applying them onto surfaces of substrates such as various materials, for example, ceramic, metal, plastic, wood and paper, and molded articles, to form a film having the above-mentioned characteristics. When a catalyst carrier comprising, for example, alumina or zirconia is used as a substrate onto which the aqueous sol is applied to form a film, the film-coating formed on the carrier is used as a filmy supported catalyst. When a glass tube or a plastic cover of a lighting appliance such as a fluorescence lamp is used as a substrate for the formation of a film thereon, the resulting film is transparent and has catalytic activity, and further, effectively prevents adhesion of contaminants on the surface of the glass tube or the cover. This film does not shield light and exhibits enhanced photocatalytic activity, and can decompose organic substances, such as lampblack, present on the surface. When the aqueous sol is used for formation of a film on the surface of glass used for building construction or a wall material, the film can also prevent adhesion of contaminants. Consequently, a glass window pane and a wall material of a tall building do not require cleaning, thus leading to reduction of the cost for building maintenance.

What is claimed is:

1. An amorphous titanium-containing finely divided particulate material, which has an average particle diameter in the range of 0.8 to 15 nm, and is prepared by hydrolyzing titanium tetrachloride in an aqueous solution in the presence of at least one carboxylic acid selected from the group consisting of oxalic acid, citric acid, tartaric acid, malic acid and succinic acid; said titanium-containing material exhibiting a light transmittance of at least 85% as measured at a wavelength of 450–700 nm for a thickness of 10 mm on an aqueous liquid containing the titanium-containing material in a concentration of 0.1 to 6.5 moles per liter as titanium.

2. An aqueous sol composition of a titanium-containing finely divided particulate material, which comprises the titanium-containing finely divided particulate material, as claimed in claim 1, in a concentration of 0.1 to 6.5 moles per liter as titanium, and further comprises at least one carboxylic acid selected from the group consisting of oxalic acid, citric acid, tartaric acid, malic acid and succinic acid.

3. A process for producing the titanium-containing finely divided particulate material as claimed in claim 1, comprising the step for hydrolyzing titanium tetrachloride in an aqueous liquid in the presence of at least one carboxylic acid selected from the group consisting of oxalic acid, citric acid, tartaric acid, malic acid and succinic acid.

4. The process for producing the titanium-containing finely divided particulate material according to claim 3, wherein the amount of the carboxylic acid is in the range of 0.01 to 10 moles per mole of titanium atom and in the range of 0.01 to 10 moles per liter of the aqueous liquid.

5. The process for producing the titanium-containing finely divided particulate material according to claim 4, wherein an aqueous titanium tetrachloride solution is hydrolyzed at a temperature of at least 50° C. but not higher than the boiling point of the aqueous solution.

6. The process for producing the titanium-containing finely divided particulate material according to claim 5, wherein the hydrolysis is carried out while hydrogen chloride generated by the hydrolysis is controlled so as not to escape from the reaction system, and then thus-obtained aqueous liquid is subjected to a dechlorination treatment.

7. The process for producing the titanium-containing finely divided particulate material according to claim 4, wherein the hydrolysis is carried out while hydrogen chloride generated by the hydrolysis is controlled so as not to escape from the reaction system, and then the thus-obtained aqueous liquid is subjected to a dechlorination treatment.

8. The process for producing the titanium-containing finely divided particulate material according to claim 3, wherein an aqueous titanium tetrachloride solution is hydrolyzed at a temperature of at least 50° C. but not higher than the boiling point of the aqueous solution.

9. The process for producing the titanium-containing finely divided particulate material according to claim 3, wherein the hydrolysis is carried out while hydrogen chloride generated by the hydrolysis is controlled so as not to escape from the reaction system, and then the thus-obtained aqueous liquid is subjected to a dechlorination treatment.

10. A shaped article comprising a shaped substrate and a film formed on a surface of the substrate; said film comprising the titanium-containing finely divided particulate material as claimed in claim 1.

11. A titanium-containing coating liquid which is an aqueous liquid comprising an amorphous titanium-containing finely divided particulate material having an average particle diameter in the range of 0.8 to 15 nm, and further comprising at least one carboxylic acid selected from the group consisting of oxalic acid, citric acid, tartaric acid, malic acid and succinic acid; said titanium-containing material being contained in a finely dispersed form in a concentration of 0.1 to 6.5 moles as titanium per liter of the aqueous liquid; said aqueous liquid exhibiting a light transmittance of at least 85% as measured at a wavelength of 450 to 700 nm for a thickness of 10 mm.

12. The titanium-containing coating liquid according to claim 11, wherein the aqueous liquid further comprises not greater than 10% by weight of a water soluble high polymer.

13. A process for producing the titanium-containing coating liquid as claimed in claim 11, comprising the step of hydrolyzing titanium tetrachloride in an aqueous liquid in the presence of at least one carboxylic acid selected from the group consisting of oxalic acid, citric acid, tartaric acid, malic acid and succinic acid.

14. The process for producing the titanium-containing coating liquid according to claim 13, wherein the amount of the carboxylic acid is in the range of 0.01 to 10 moles per mole of titanium atom and in the range of 0.01 to 10 moles per liter of the aqueous liquid.

15. The process for producing the titanium-containing coating liquid according to claim 14, wherein an aqueous titanium tetrachloride solution is hydrolyzed at a temperature of at least 50° C. but not higher than the boiling point of the aqueous solution.

16. The process for producing the titanium-containing coating liquid according to claim 14, wherein the hydrolysis is carried out while hydrogen chloride generated by the hydrolysis is controlled so as not to escape from the reaction system, and then the thus-obtained aqueous liquid is subjected to a dechlorination treatment.

17. The process for producing the titanium-containing coating liquid according to claim 13, wherein an aqueous titanium tetrachloride solution is hydrolyzed at a temperature of at least 50° C. but not higher than the boiling point of the aqueous solution.

18. The process for producing the titanium-containing coating liquid according to claim 13, wherein the hydrolysis is carried out while hydrogen chloride generated by the hydrolysis is controlled so as not to escape from the reaction system, and then the thus-obtained aqueous liquid is subjected to a dechlorination treatment.

\* \* \* \* \*